July 11, 1933.  R. C. WORRELL  1,918,008
COMBINATION AIR DIFFUSER AND DAMPER
Filed Dec. 4, 1931   2 Sheets-Sheet 1

Inventor
Robert C. Worrell
By Clarence A. O'Brien
Attorney

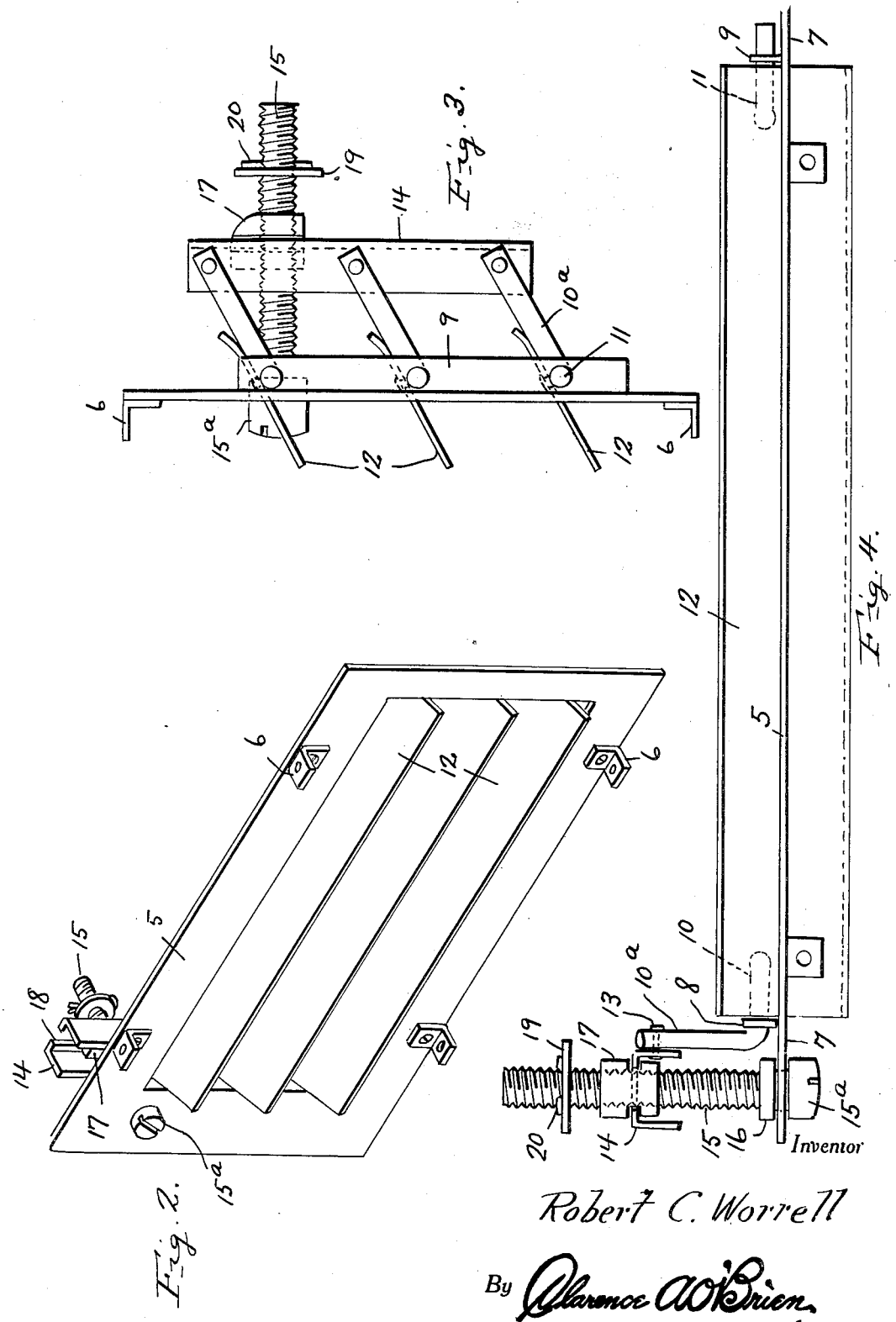

Patented July 11, 1933

1,918,008

UNITED STATES PATENT OFFICE

ROBERT C. WORRELL, OF CHESTER, PENNSYLVANIA

COMBINATION AIR DIFFUSER AND DAMPER

Application filed December 4, 1931. Serial No. 579,008.

This invention relates broadly to ventilating grilles for register and the primary object of the invention is to provide a device for use in conjunction therewith for controlling the passage of air through the ventilator grille or register.

A still further object of the invention is to provide means for the purpose above mentioned which will be equally effective when used either with a supply or exhaust ventilator grille or register.

Other objects and advantages of the invention will become apparent from a study of the following description, taken in connection with the accompanying drawings wherein:

Figure 2 is a perspective view thereof.

Figure 3 is an end elevational view thereof.

Figure 4 is a top plan view thereof.

Figure 1:
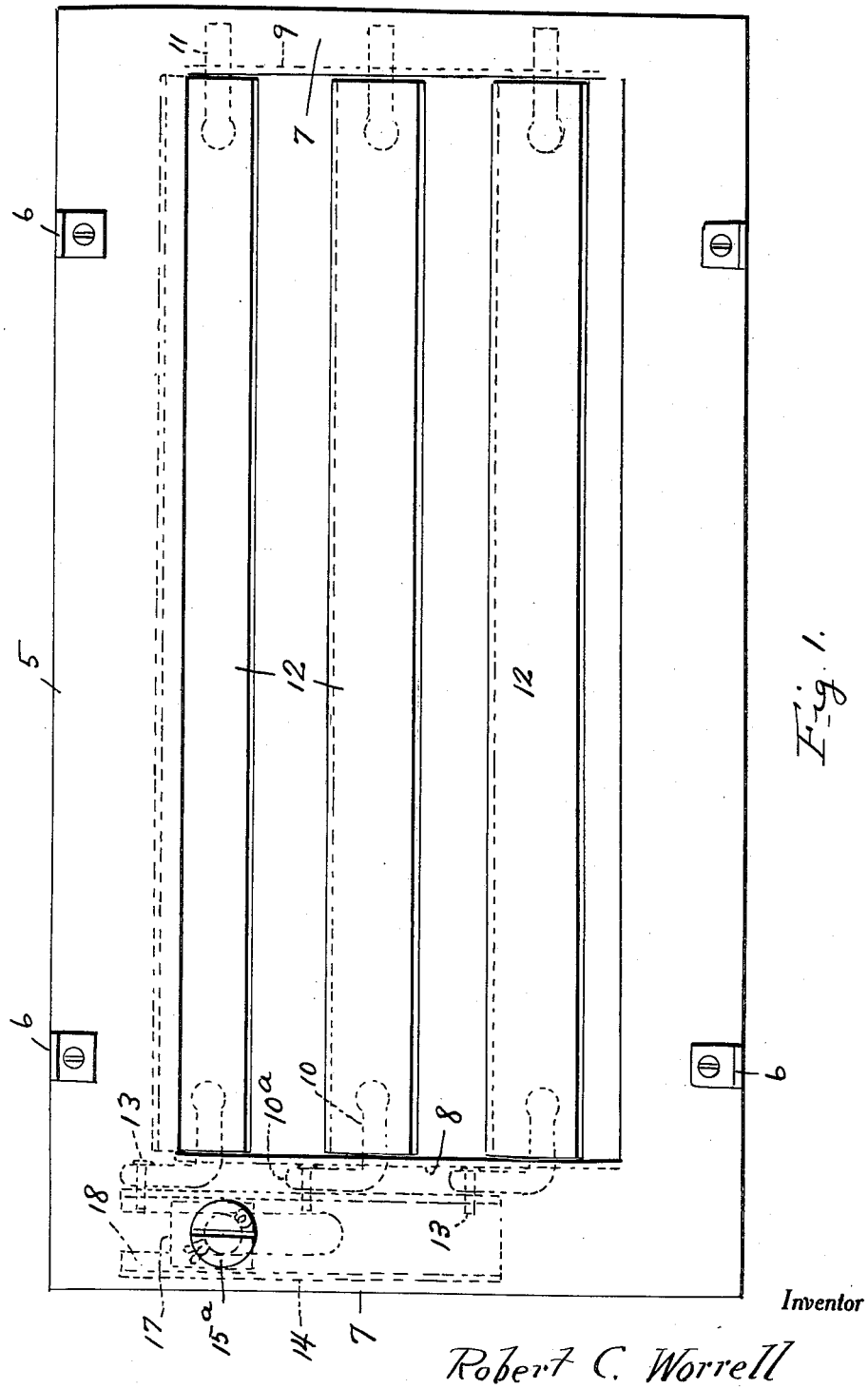
Figure 1 is a front elevational view of the improved combined diffuser and damper.

With reference more in detail to the drawings, it will be seen that the device comprises a frame 5 provided adjacent its upper and lower edges with suitable lugs 6 to facilitate fixedly mounting the damper directly behind the grille or ventilating register. The end members 7 of the frame on one side thereof are provided with vertical bars 8, 9 suitably apertured for the reception of the pivot pin 10 and 11 of the slats 12.

The pivot pins 10 are provided with angularly disposed arms 10a which are pivoted as at 13 to one side or flange of a channel member 14. Thus it will be seen that the channel member 14 serves to connect the slats 12 for simultaneously actuating them.

The slats 12 are rotated to the desired position, and are secured at the desired adjustment through the medium of an adjusting bolt 15 to one end of which is equipped with a bolt head 15a that extends through a suitable aperture in the side member 7 supporting the bar 8.

A collar 16 on the bolt operates with the head 15 for securing the bolt 15 in position and freely so that the bolt 15 may be rotated.

Engaged with the bolt 15 is a nut 17. The web or closed side of the channel member 14 is provided with a vertical slot 18 for accommodating the nut 17. The nut 17 is provided on opposite sides thereof with grooves for accommodating adjacent portions or edges of the channel member 14 defining the vertical sides of the slot 18 as clearly suggested in Figures 1 and 4.

To limit axial movement of the bolt 15 in one direction relative to the nut 17 there is provided on the bolt 15 adjacent its free end a suitable washer 19 that is confined between one end of the nut 17 and a cotter pin 20 extending through the bolt.

From the foregoing then it will be apparent that by rotating the screw 15 toward the right in Figure 4, nut 17 will be caused to move inwardly toward the frame causing the channel member 14 to move in a corresponding direction with the result that pivot pins 10 will be rotated in an anti-clockwise direction in Figure 3 for swinging the levers downwardly or in an anti-clockwise direction. Obviously by rotating the screw 15 in an opposite direction the levers or slats 12 will be caused to swing in a clockwise direction and will be retained at the desired adjustment.

In actual practice, when the diffuser is used with exhaust grilles, the frame could be mounted so as to have the slats 12 rotate in a vertical plane and by suitably adjusting the slats the air may be directed upwardly or downwardly as found desirable. It will be found preferable when using the diffuser or damper with exhaust grilles to adjust the slats for directing the air downwardly which would tend to stop a short circuit of air between supply and exhaust as quite often supply must be directed over the exhaust with only a few feet between. When also used with exhaust grilles the device may be arranged so as to have the slats swing in a horizontal plane and thus direct the currents of air toward the right or left.

When used with a supply grille or register the fuser should preferably be arranged so that the slats swing in a vertical plane and the slats positioned at that angle which will direct the air upwardly and so dissipate the air to a point further in the room before it spreads out thereby tending to eliminate draft.

Even though I have herein shown and described the preferred embodiment of the invention, it is to be understood that the same is susceptible to further changes, modifications and improvements coming within the scope of the appended claims.

Having thus described my invention, what I claim as new is:

1. A device of the character described comprising a frame, slats pivotally connected with said frame, a screw extending through a member of the frame, means for retaining the screw in position on said frame member for rotative movement but not longitudinal movement, a member pivotally connected with said slats, and a nut on said screw slidably engaged with said member.

2. A device of the character described comprising a frame, slats pivotally connected with the frame, a connecting member pivotally connected with slats, said member being provided with a slot, a nut arranged in said slot and constrained to shift longitudinally thereof, and a screw extending through said frame and having threaded engagement with said nut.

3. A combination air diffuser and damper comprising a frame, a plurality of spaced slats pivotally mounted on the frame, angular arms on the slats at one end thereof, a channel member, said arm having free ends pivotally connected to one side of said channel member, and said channel member adjacent its upper end being provided with a slot, a nut slidably arranged in said slot and having grooved portions receiving opposite edges of the channel member forming the sides of the slot, a screw having an end rotatably supported on said frame, and also having a threaded shank screw threadedly engaged with said nut whereby upon rotation of said screw said nut will be caused to shift relative thereto and longitudinally in said slot for actuating said channel member and thereby move the slats to open or closed positions.

In testimony whereof I affix my signature.

ROBERT C. WORRELL.